US011288771B2

(12) United States Patent
Zhang et al.

(10) Patent No.: US 11,288,771 B2
(45) Date of Patent: Mar. 29, 2022

(54) TEXTURE HALLUCINATION FOR LARGE-SCALE IMAGE SUPER-RESOLUTION

(71) Applicant: ADOBE INC., San Jose, CA (US)

(72) Inventors: Yulun Zhang, Somerville, MA (US); Zhifei Zhang, San Jose, CA (US); Jose Ignacio Echevarria Vallespi, San Francisco, CA (US); Zhaowen Wang, San Jose, CA (US); Stephen Diverdi, Berkeley, CA (US)

(73) Assignee: ADOBE INC., San Jose, CA (US)

( * ) Notice: Subject to any disclaimer, the term of this patent is extended or adjusted under 35 U.S.C. 154(b) by 50 days.

(21) Appl. No.: 16/861,688

(22) Filed: Apr. 29, 2020

(65) Prior Publication Data

US 2021/0342974 A1     Nov. 4, 2021

(51) Int. Cl.
    *G06T 3/40*     (2006.01)
(52) U.S. Cl.
    CPC .......... *G06T 3/4053* (2013.01); *G06T 3/4046* (2013.01); *G06T 3/4084* (2013.01)
(58) Field of Classification Search
    CPC .... G06T 3/4053; G06T 3/4084; G06T 3/4046
    See application file for complete search history.

(56) References Cited

U.S. PATENT DOCUMENTS 2,890,784 A * 6/1959 Vern ...................... B65G 47/80
    198/392
9,865,036 B1 * 1/2018 Liu ...................... G06K 9/6256
9,875,523 B2 * 1/2018 Toyoda ................. G06T 3/4053
10,621,697 B2 * 4/2020 Chou ....................... G06T 1/20
(Continued)

FOREIGN PATENT DOCUMENTS

AT             506620 A1 * 10/2009 .......... B41J 11/0065
CN        107492070 A * 12/2017
(Continued)

OTHER PUBLICATIONS

Marco Bevilacqua, et al. "Low-Complexity Single-Image Super-Resolution Based on Nonnegative Neighbor Embedding", BMVC, 2012.
(Continued)

*Primary Examiner* — Charles T Shedrick
(74) *Attorney, Agent, or Firm* — F. Chau & Associates, LLC (57) ABSTRACT

Systems and methods for texture hallucination with a large upscaling factor are described. Embodiments of the systems and methods may receive an input image and a reference image, extract an upscaled feature map from the input image, match the input image to a portion of the reference image, wherein a resolution of the reference image is higher than a resolution of the input image, concatenate the upscaled feature map with a reference feature map corresponding to the portion of the reference image to produce a concatenated feature map, and generate a reconstructed image based on the concatenated feature map using a machine learning model trained with a texture loss and a degradation loss, wherein the texture loss is based on a high frequency band filter, and the degradation loss is based on a downscaled version of the reconstructed image.

20 Claims, 8 Drawing Sheets

(56) References Cited

U.S. PATENT DOCUMENTS

| | | | |
|---|---|---|---|
| 2008/0226148 A1* | 9/2008 | Gu | G06T 7/0002 |
| | | | 382/128 |
| 2011/0206296 A1* | 8/2011 | Sakaguchi | G06T 3/4053 |
| | | | 382/299 |
| 2018/0300855 A1* | 10/2018 | Tang | G06T 3/4053 |
| 2019/0378242 A1* | 12/2019 | Zhang | G06K 9/6201 |
| 2020/0242515 A1* | 7/2020 | Reddy | G06N 20/10 |
| 2021/0004935 A1* | 1/2021 | Yao | G06T 3/4053 |
| 2021/0133920 A1* | 5/2021 | Lee | G06T 5/20 |
| 2021/0150678 A1* | 5/2021 | Yi | G06N 3/084 |
| 2021/0224951 A1* | 7/2021 | Ahn | G06T 5/002 |

FOREIGN PATENT DOCUMENTS

| | | | | |
|---|---|---|---|---|
| EP | | 1814076 A1 * | 8/2007 | G06T 3/4053 |
| EP | | 3720138 A1 * | 10/2020 | G06T 3/4046 |
| WO | WO-2009141770 A1 * | | 11/2009 | G06T 3/4053 |
| WO | WO-2011111819 A1 * | | 9/2011 | G06T 3/4046 |
| WO | WO-2013131851 A2 * | | 9/2013 | G06T 3/4076 |
| WO | WO-2016132154 A1 * | | 8/2016 | H04N 19/172 |
| WO | WO-2018193333 A1 * | | 10/2018 | G06N 3/084 |
| WO | WO-2019147020 A1 * | | 8/2019 | G06T 5/00 |
| WO | WO-2021061335 A1 * | | 4/2021 | A61B 5/065 |

OTHER PUBLICATIONS

Vivek Boominathan, et al. "Improving Resolution and Depth-of-Field of Light Field Cameras Using a Hybrid Imaging System", ICCP, 2014.

Hong Chang, et al, "Super-Resolution Through Neighbor Embedding", CVPR, 2004.

Chao Dong, et al., "Learning a Deep Convolutional Network for Image Super-Resolution", ECCV, 2014.

Chao Dong, et al., Accelerating the Super-Resolution Convolutional Neural Network, ECCV, 2016.

Gilad Freedman, et al., "Image and Video Upscaling From Local Self-Examples", TOG, 2011.

William T Freeman, et al., Example-Based Super-Resolution, IEEE Computer Graphics and Applications, (2):56-65, 2002.

William T Freeman, et al., "Learning Low-Level Vision", IJCV, 2000.

Leon A Gatys, et al., "Image Style Transfer Using Convolutional Neural Networks", CVPR, 2016.

Ian Goodfellow, et al., "Generative Adversarial Nets, "NeurIPS, 2014.

Ishaan Gulrajani, et al., "Improved Training of Wasserstein Gans", NeurIPS, 2017.

Kaiming He, et al., "Deep Residual Learning for Image Recognition", CVPR, 2016.

Jia-Bin Huang, et al., "Single Image Super-Resolution From Transformed Self-Exemplars", CVPR, 2015.

Justin Johnson, et al., "Perceptual Losses for Real-Time Style Transfer and Super-Resolution", ECCV, 2016.

Jiwon Kim et al., "Accurate Image Super-Resolution Using Very Deep Convolutional Networks", CVPR, 2016.

Jiwon Kim, et al., "Deeply-Recursive Convolutional Network for Image Super-Resolution", CVPR, 2016.

Diederik Kingm, et al., "A Method for Stochastic Optimization", ICLR, 2014.

Wei-Sheng Lai, et al., "Deep Laplacian Pyramid Networks for Fast and Accurate Super-Resolution", CVPR, 2017.

Christian Ledig, et al., "Photo-Realistic Single Image Super-Resolution Using a Generative Adversarial Network", CVPR, 2017.

Chen-Yu Lee, et al., "Deeply-Supervised Nets", . In AISTATS, 2015.

Bee Lim, et al., "Enhanced Deep Residual Networks for Single Image Super-Resolution", CVPRW, 2017.

David Martin, et al., "A Database of Human Segmented Natural Images and Its Application To Evaluating Segmentation Algorithms and Measuring Ecological Statistics", ICCV, 2001.

Mehdi SM Sajjadi, et al., "Enhancenet: Single Image Super-Resolution Through Automated Texture Synthesis", ICCV, 2017.

Wenzhe Shi, et al., "Real-Time Single Image and Video Super-Resolution Using an Efficient Sub-Pixel Convolutional Neural Network", CVPR, 2016.

Karen Simonyan, et al., "Very Deep Convolutional Networks for Large-Scale Image Recognition", arXiv preprint arXiv:1409.1556, 2014.

Libin Sun, et al., "Super-Resolution From Internet-Scale Scene Matching", ICCP, 2012.

Zhou Wang, et al., "Image Quality Assessment: From Error Visibility To Structural Similarity", TIP, 2004.

Zhaowen Wang, et al., "Deep Networks for Image Super-Resolution With Sparse Prior", ICCV, 2015.

Wenhan Yang, et al., "Reference-Guided Deep Super-Resolution Via Manifold Localized External Compensation", TCSVT, 2018.

Jaejun Yoo, et al., "Photorealistic Style Transfer Via Wavelet Transforms", ICCV, 2019.

Huanjing Yue, et al., "Landmark Image Super-Resolution By Retrieving Web Images", TIP, 2013.

Roman Zeyde, et al., "On Single Image Scale-Up Using Sparse-Representations", Proc. 7th Int. Conf. Curves Surf., 2010.

He Zhang, et al., "Densely Connected Pyramid Dehazing Network", CVPR, 2018.

Yulun Zhang, et al., "Image Super-Resolution Using Very Deep Residual Channel Attention Networks", ECCV, 2018.

Yulun Zhang, et al., "Residual Dense Network for Image Super-Resolution", CVPR, 2018.

Zhifei Zhang, et al., "Image Super-Resolution By Neural Texture Transfer", CVPR, 2019.

Haitian Zheng, et al., "Combining Exemplar-Based Approach and Learning-Based Approach for Light Field Super-Resolution Using a Hybrid Imaging System", ICCV, 2017.

Haitian Zheng, et al., "Crossnet: An End-To-End Reference-Based Super Resolution Network Using Cross-Scale Warping", ECCV, 2018.

* cited by examiner

(12) United States Patent

TEXTURE HALLUCINATION FOR LARGE-SCALE IMAGE SUPER-RESOLUTION

BACKGROUND

The following relates generally to image upscaling, and more specifically to texture hallucination with a large upscaling factor.

In computer graphics, scaling refers to the resizing of a digital image. Images can be both downscaled (i.e., made smaller) and upscaled (i.e., made bigger). When scaling a raster image (i.e., an image composed of a particular number of pixels associated with color information), the resolution, or number of pixels in the image, increases. In doing so, additional information may be inferred to increase the total amount of information represented in the digital image file.

Conventional scaling techniques can be effective at interpolating image information for scaling factors of up to 4. However, when applying these techniques for higher scaling factors, image details and fine textures ("high frequency information") can be lost or may not be produced. This can result in low quality images. For example, the images can lack meaningful detail at the desired resolution and may appear blurry. Therefore, there is a need in the art for systems and methods for upscaling that can be used for large scaling factors without resulting in low quality images.

SUMMARY

A method, apparatus, and non-transitory computer readable medium for texture hallucination with a large upscaling factor are described. Embodiments of the method, apparatus, and non-transitory computer readable medium may be receiving an input image and a reference image; generating a combined feature map using a machine learning model, the combined feature map including large scale features from the input image and texture features from the reference image; and generating a reconstructed image based on the combined feature map using the machine learning model, wherein the reconstructed image comprises an upscaled version of the input image with texture detail derived from the reference image and wherein the machine learning model is trained using a texture loss based on the texture detail.

A method, apparatus, and non-transitory computer readable medium for training an artificial neural network (ANN) for texture hallucination with a large upscaling factor are described. Embodiments of the method, apparatus, and non-transitory computer readable medium may extract an upscaled feature map from an input image, match the input image to a portion of a reference image, wherein a resolution of the reference image is higher than a resolution of the input image, concatenate the upscaled feature map with a reference feature map corresponding to the portion of the reference image to produce a concatenated feature map, generate a reconstructed image based on the concatenated feature map using the ANN, compute a texture loss based on a high frequency band filter and a degradation loss based on a downscaled version of the reconstructed image, and update the ANN based on the texture loss and the degradation loss.

An apparatus and method for texture hallucination with a large upscaling factor are described. Embodiments of the apparatus and method may include an upscaling component configured to extract an upscaled feature map from an input image, a matching component configured to match the input image to a portion of a reference image, wherein a resolution of the reference image is higher than a resolution of the input image, a concatenation component configured to concatenate the upscaled feature map with a reference feature map corresponding to the portion of the reference image to produce a concatenated feature map, and a reconstruction component configured to generate a reconstructed image based on the concatenated feature map, wherein the reconstruction component is trained with a texture loss and a degradation loss, wherein the texture loss is based on a high frequency band filter, and the degradation loss is based on a downscaled version of the reconstructed image.

DETAILED DESCRIPTION

The present disclosure relates to image upscaling. Embodiments of the present disclosure perform texture hallucination for image upscaling with scaling factors of greater than 4. Image upscaling refers to increasing the number of pixels (i.e., the resolution) of a digital image. For raster images, this may include interpolating additional high frequency information such as fine details or textures. Conventional upscaling methods would yield blurry results at such large scaling factors, significantly degrading visual quality. Especially, those images with fine texture, e.g., paintings with brush stroke and canvas grid, would suffer more on texture loss.

Conventional upscaling techniques can be effective for scaling factors of up to 4. These techniques can include averaging multiple images, low-pass filtering, or applying interpolation algorithms based on Fourier transforms. In some cases, machine learning may also be used to perform upscaling. Machine learning techniques for upscaling can be further classified as single-image super-resolution (SISR) and reference-based super-resolution (RefSR).

The prior use of algorithmic interpolation and SISR for upscaling by factors of greater than 4 often produce overly smooth or blurry images and unwanted image artifacts. Furthermore, RefSR methods may be difficult to apply for higher scaling factors. For example, RefSR may be computationally intensive and may result in the transfer of unwanted colors or textures from a reference image.

Embodiments of the present disclosure provide systems and methods for improved RefSR that are effectively applied at large upscaling factors. According to at least one embodiment, texture transfer is performed by conducting searching on small-scale feature maps and transferring correspondingly fine textures from the reference to larger-scale feature maps. This significantly increases the efficiency of handling large-scale super-resolution to resolve problems such as color shift. Further, feature extraction pipeline is pruned by removing the batch normalization layers to achieve higher efficiency and enables a larger scaling factor. According to embodiments of the present disclosure, an artificial neural network (ANN) is trained using a multi-task loss function including a wavelet texture loss and degradation loss. The wavelet texture loss constrains the transfer band, i.e., only high-frequency details are transferred from the reference to output. The degradation loss ensures the downscaled version of the output would be still faithful to the input, i.e., preserving the color tone and spatial structure. In so doing, texture transfer is achieved while preserving the input content.

The following terms are used throughout the present disclosure:

The term "input image" refers to an original, relatively low resolution image to be upscaled to a higher resolution.

The term "reference image" refers to a relatively high resolution image that can be used as a basis for transferring textures for the upscaled image.

The term "feature map" refers to data about an image (including the input image, the reference image, or a combination of both) that has been extracted using a portion of an ANN for use in reconstructing an upscaled image.

The term "loss function" refers to a function used in training an ANN to compare the predicted output with a desired output to determine whether or how to update parameters of the ANN. In some cases, a loss function may include multiple tasks (i.e., terms of the loss function designed to encourage the network to achieve a particular outcome). Different loss terms may be applied simultaneously, or at different stages of training.

The term "texture loss" refers to a loss term in which high frequency information (i.e., texture information) from the output is compared to high frequency information from the reference image to ensure that textures are accurately captured in the reconstructed image. The texture loss may be determined after the application of a wavelet transform and a high frequency filter to focus or limit the loss term to high frequency information.

The term "degradation loss" refers to a loss term in which an output of the ANN is compared to the original input image. For example, the output can be downscaled and the loss term can be computed based on differences between the downscaled output image and the input image. The degradation loss may ensure that the original features of the input image are not lost during reconstruction.

Image Upscaling

Figure 1:
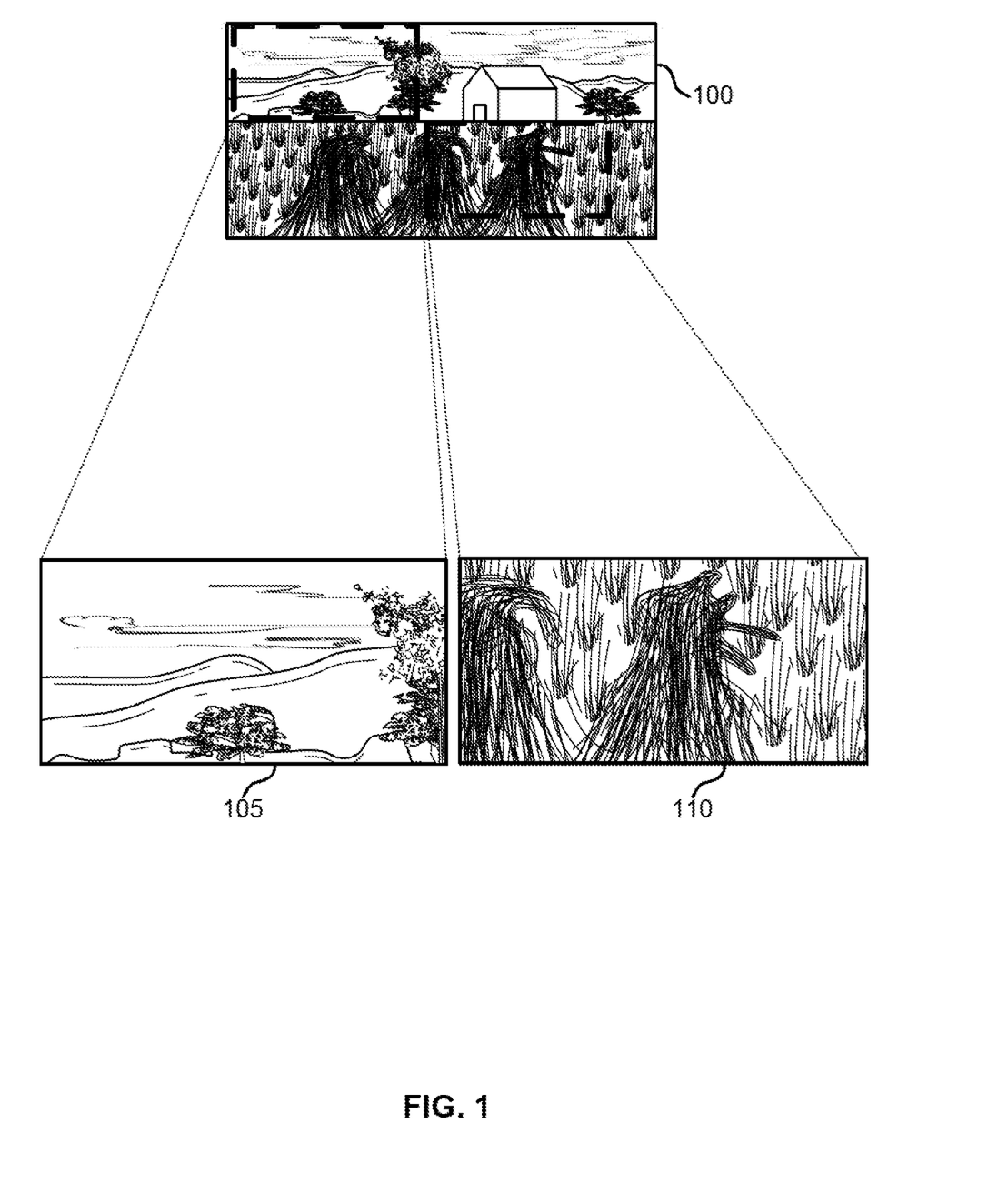
FIG. 1 shows an example of upscaled portions of an image according to aspects of the present disclosure.

FIG. 1 shows an example of upscaled portions of an image 100 according to aspects of the present disclosure. Image 100 may include first portion 105 and second portion 110. The upscaled portions of the image 100 illustrate how an image can be upscaled and additional texture can be inferred based on a reference image such that the upscaled image includes a significant level of high frequency information such as painting textures or fine details.

In some cases, an upscaling factor may be applied to an image to reduce computational or memory usage for creating or storing high resolution images. Conventional super resolution (SR) techniques may be limited to upscaling factors of 4× or lower while preserving visual quality. Large scaling factors, such as 8× and 16×, may cause a loss of high-frequency information, leading to a blurry image. Textures and details are examples of high-frequency information. Images with fine texture, such as paintings with brush strokes or canvas grid, may suffer more texture loss (or more obvious texture loss) with higher scaling factors.

Although FIG. 1 shows an example in which a few representative portions are upscaled, the present disclosure is not limited thereto. For example, the first portion 105 and the second portion 110 may represent portions of an entire upscaled image corresponding to the complete image 100.

According to certain embodiments of the present disclosure, the first portion 105 and the second portion 110 may be upscaled using reference-based super-resolution (RefSR). Super-Resolution (SR) imaging refers to a category of techniques used to increase the resolution of a digital image.

Single-image super-resolution (SISR) refers to techniques to super-resolve an image depending on the image itself. SISR methods do not introduce high-quality texture details available from high-resolution reference images. SISR methods may be used for small scaling factors, but may not recover the lost details when the scaling factors are very large. As a result, the SISR methods can over-smooth and blur the output or produce undesirable artifacts.

Reference-based super-resolution (RefSR) transfers textures from reference images to an output. Thus, RefSR methods can be used to address detail loss during upscaling. However, conventional RefSR methods focus on small scaling factors and may fail under large scaling factors due to the unique challenges presented as the scaling factor increases, such as large memory consumption, color shift, and reduced control of effects from references. For example, the color of the reference may be transferred to the resulting image, which may not be expected.

Accordingly, the present disclosure describes systems and methods to super-resolve digital paintings with large scaling factors, such as 8×, 16×, or more, by synthesizing realistic textures and details. Embodiments of the present disclosure identify and use high-frequency information from a similar reference image (e.g., a painting with similar textures). The details from the reference image may be applied to a target image SR, resulting in a higher resolution image while providing improved image details. In another example, a reference image may include images corresponding to individual people in a crowd, or material textures for an image of a building.

According to some embodiments, the reference painting material compensates for information loss and helps recover visual details. Some embodiments of the present disclosure focus on painted images, since these images may contain rich texture or details. For example, a reference painting material may be used to capture similar stroke details, or a canvas grid effect.

System Overview

Figure 2:
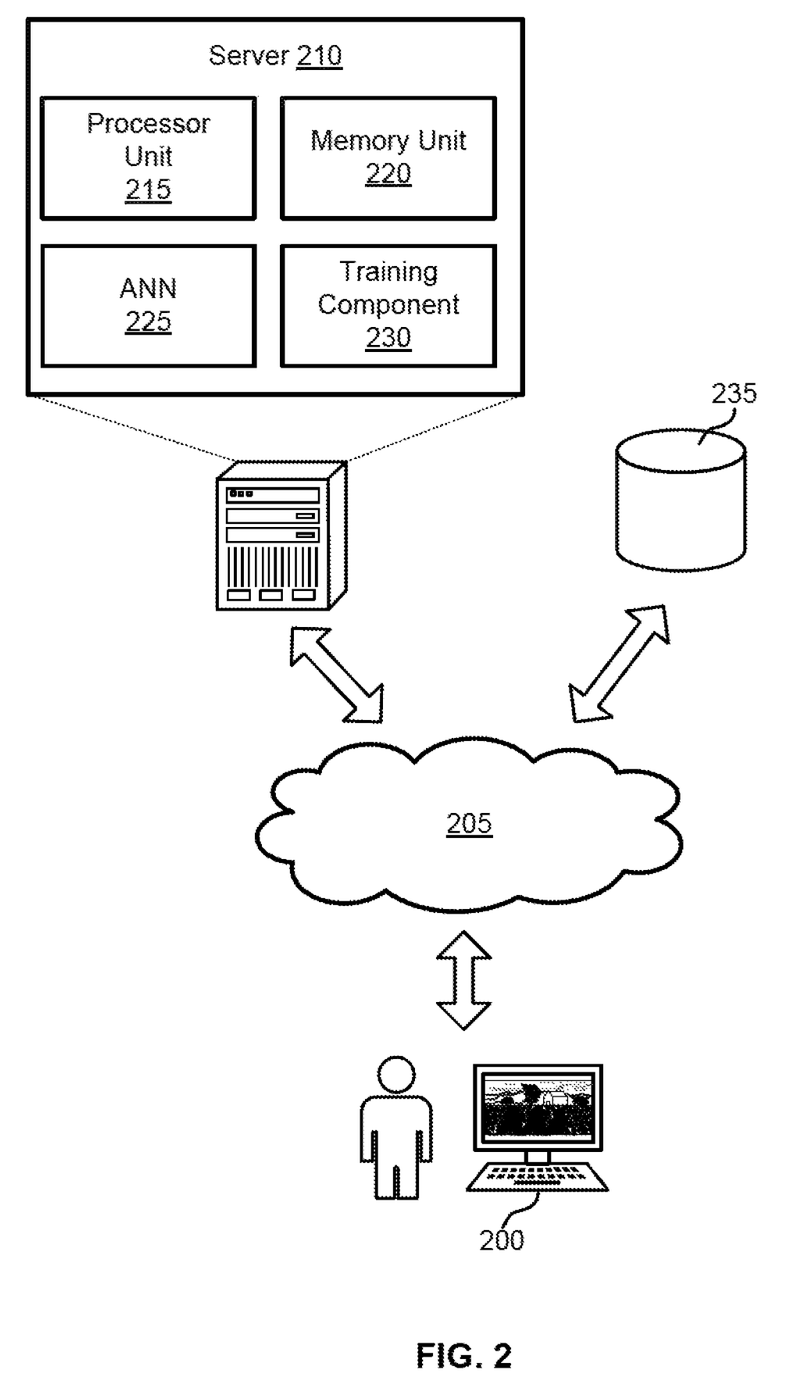
FIG. 2 shows an example of a system for image upscaling according to aspects of the present disclosure.

FIG. 2 shows an example of a system for image upscaling according to aspects of the present disclosure. The example shown includes user terminal 200, network 205, server 210, and database 235. ANN 225 may be an example of, or include aspects of, the corresponding element or elements described with reference to FIG. 4.

According to some embodiments, a user may view or edit an image using user terminal 200. The user terminal may be connected to the server 210 and a database 235 (i.e., an image database including original images or reference images) via network 205. Although according to the embodiment shown, the ANN 225 may be located on a server 210, in another embodiment, the ANN 225 may be located at a user terminal 200, and the image upscaling operations described herein may be performed locally. Thus, server 210 or user terminal 200 may include the processor unit 215, memory unit 220, ANN 225, and training component 230.

A processor unit 215 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions.

A memory unit 220 may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

The artificial neural network (ANN) 225 may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

In some cases, the ANN 225 may include a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Example embodiments of the ANN 225 may be based on texture transfer and large-scale upscaling, and may be trained using a plurality of training constraints. The texture transfer aspect identifies and transfers external high-frequency information. The external high-frequency information may be used to construct feature maps that contain more detail and are spatially aligned to the input content. The large-scale upscaling aspect extracts multi-scale features from the input and fuses the features with external features obtained from the texture transfer to synthesize high-resolution results. Further detail regarding the architecture of the ANN 225 is described with reference to FIG. 4.

Training component 230 performs training procedures for the ANN 225. For example, training component 230 may compute a texture loss based on a high frequency band filter and a degradation loss based on a downscaled version of the reconstructed image. Training component 230 may then update parameters of the ANN 225 based on the texture loss and the degradation loss. The high frequency band filter may filter out large scale features and retain high frequency features such as fine detail and texture information from the portion of the reference image that is matched to the input image.

In some examples, the texture loss is computed during a first training stage and the degradation loss is computed during a second training stage. The first training stage may be further based on a reconstruction loss comparing the reconstructed image and a ground truth image. In some examples, the second training stage is further based on a perceptual loss comparing the reconstructed image and a ground truth image and an adversarial loss based on the reconstructed image.

Training component 230 may also perform a wavelet transform on the reference feature map and on a feature map of the reconstructed image, and compare a high-frequency portion of the wavelet transform of the reference feature map with a high frequency portion of the wavelet transform of the feature map of the reconstructed image, where the texture loss is computed based on the comparison. Training component 230 may also downscale the reconstructed image to produce the downscaled version of the reconstructed image for the texture loss.

Thus, the present disclosure uses a wavelet texture loss and degradation loss in the calculations. Together, the wavelet texture loss and the degradation loss achieve large scaling factors and generate visually pleasing results. In some embodiments, the training constraints on wavelet textures and degraded reconstruction may be designed specifically for large scaling factors. They may be used to preserve content such as spatial structure and color, as well as introducing more details from the reference image.

Figure 3:
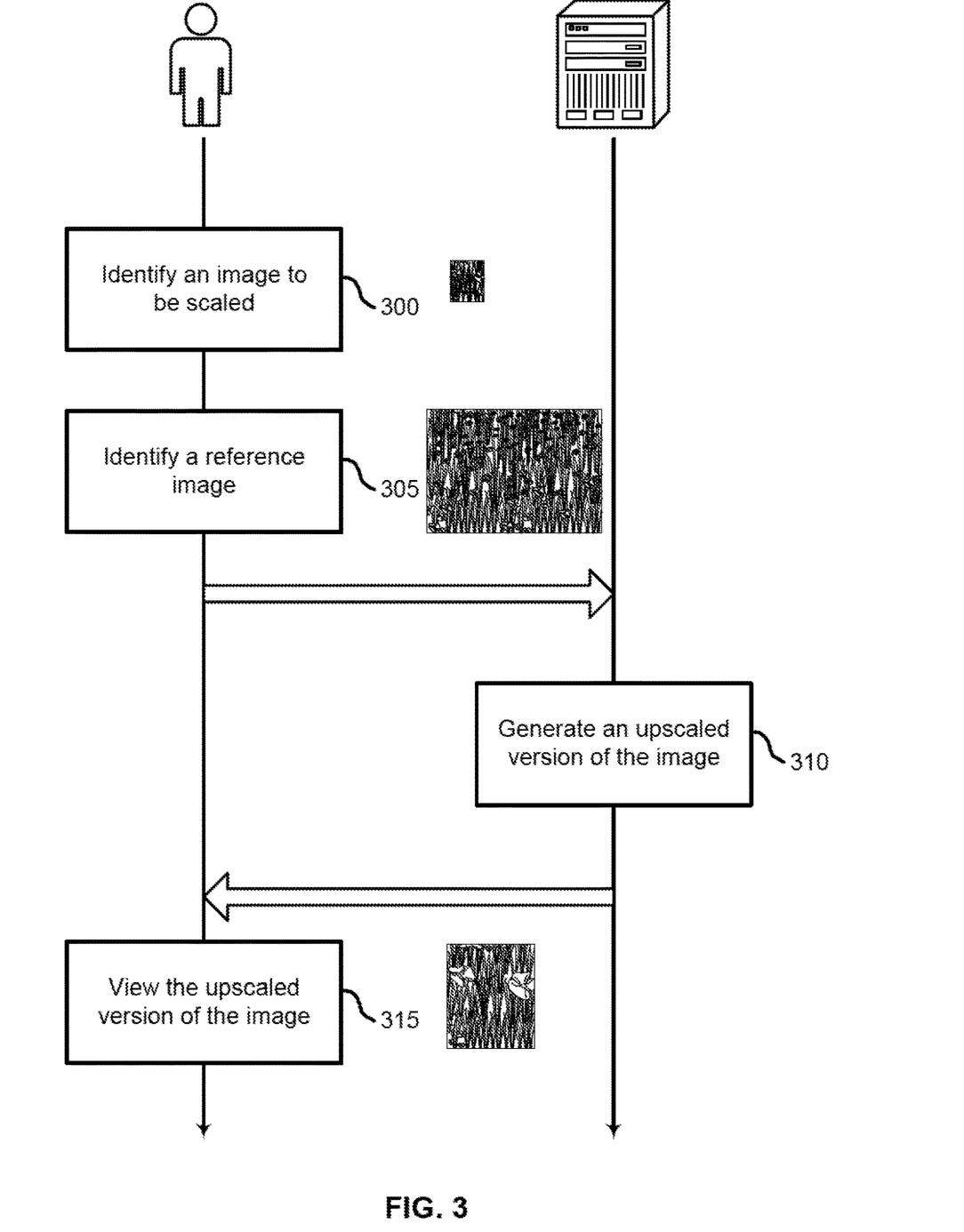
FIG. 3 shows an example of a process for image upscaling according to aspects of the present disclosure.

FIG. 3 shows an example of a process for image upscaling according to aspects of the present disclosure. In some examples, these operations may be performed by a system such as a server including a processor executing a set of codes. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 300, a user identifies an image to be scaled. At operation 305, the user identifies a reference image. Alternatively, the reference image may be selected automatically, e.g., using an algorithmic or machine learning search process for identifying images with relevant textures. In some cases, the image may be associated with lookup information for identifying the reference image. That is, the original image and the reference image may be associated, but the input image may be stored in one location and the reference image may be stored in another location (e.g., in a database as illustrated in FIG. 2). Both the image and the reference image may then be communicated to a server for processing.

In the illustrated example, a small image of several flowers is used, in addition to a reference image including a field of flowers having similar texture of detail to the low resolution image (e.g., the original, small image depicting several flowers).

At operation 310, the system generates an upscaled version of the image. The upscaled version of the image may include textures adapted from the reference image according to the techniques described herein. For example, the upscaled image features may be extracted from the image in addition to features from the reference image. These extracted image features may be combined and an upscaled version of the image may be reconstructed. The process may be performed using an ANN trained using a plurality of loss terms including a degradation loss and a texture loss.

At operation 315, the user views or manipulates the upscaled version of the image. The upscaled image may include large scale features from the input image, and may also include fine details and textures from the reference image.

Embodiments of present disclosure include a reference-based super-resolution network for large-scale painting hallucination, resulting in increased image quality. High-quality painting images may be used to process such a task. Visual differences may be contrasted with conventional SISR and RefSR methods using scaling factors of 8× and 16×. SISR may generate some unnatural over-smoothing and blurring.

RefSR methods may enable increased visual performance compared to SISR. For example, results of a RefSR network for large-scale painting hallucination may be more faithful to the ground truth. However, with large scaling factors, conventional SISR and RefSR may both generate unwanted artifacts and may struggle to recover details. However, embodiments of the techniques described herein address this issue by providing a reference-based super-resolution network for large-scale painting hallucination that can faithfully transfer texture details without transferring unwanted features or artifacts into the upscaled image.

System Architecture

Figure 4:
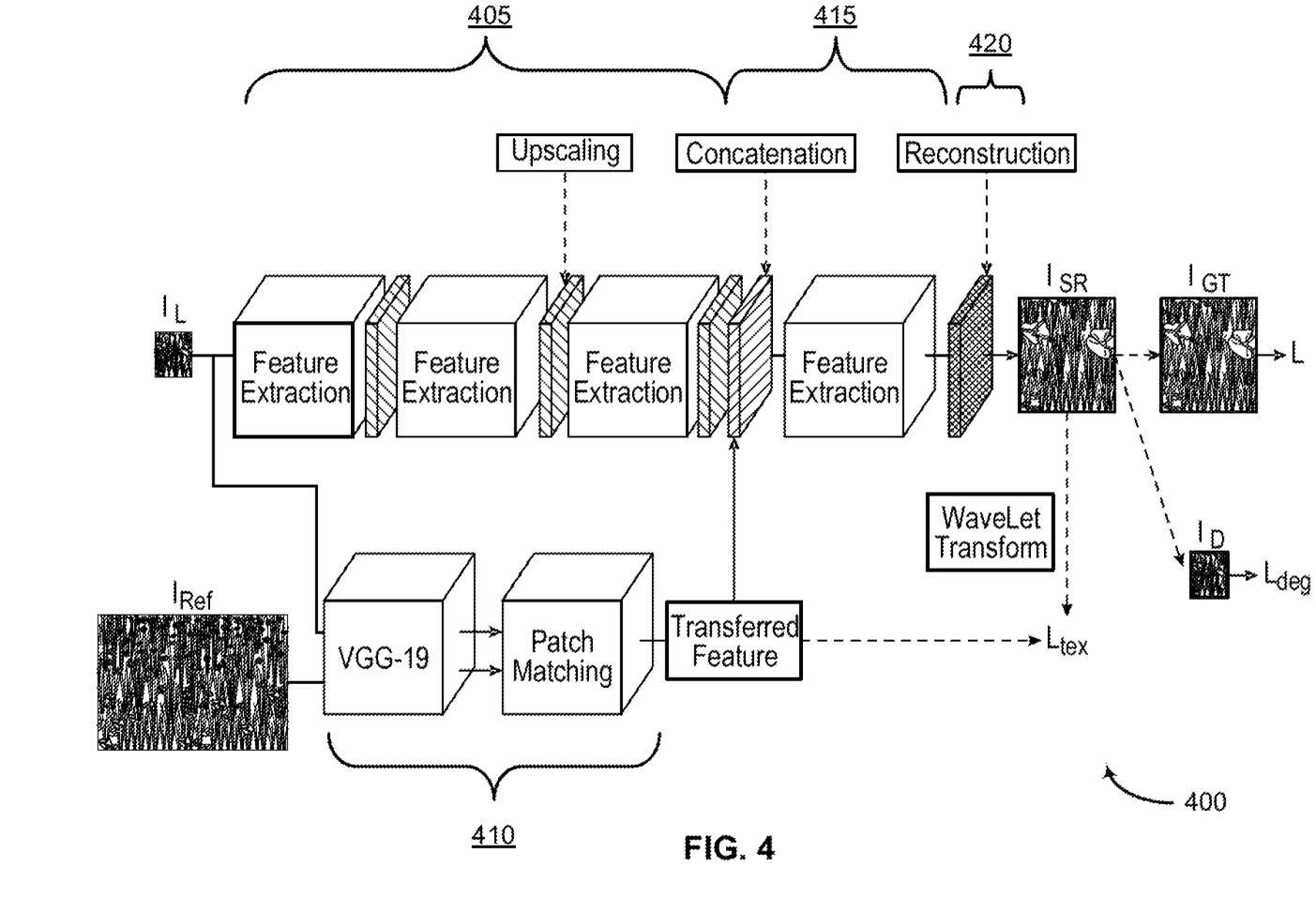
FIG. 4 shows an example of an artificial neural network (ANN) for image upscaling according to aspects of the present disclosure.

FIG. 4 shows an example of an ANN 400 for image upscaling according to aspects of the present disclosure. ANN 400 may be an example of, or include aspects of, the corresponding element or elements described with reference to FIG. 2. ANN 400 may include upscaling component 405, matching component 410, concatenation component 415, and reconstruction component 420.

Aspects of the ANN 400 may include a texture transfer scheme, a feature extraction pipeline, and loss calculations based on a degradation loss and a texture loss. In some examples, the texture transfer scheme may be optimized by conducting searching on small-scale feature maps, and transferring correspondingly fine textures from the reference image onto larger-scale feature maps. Accordingly, the efficiency of performing large-scale super-resolution may increase while avoiding the transfer of low frequency information from the reference image such as color or large scale features.

In some examples, the feature extraction pipeline may be pruned by removing one or more batch normalization layers. As a result, the SR imaging system of the present disclosure achieves increased efficiency, enabling the use of a larger scaling factor. Wavelet texture loss and degradation loss are used to train the model to encourage texture transfer while at the same time preserving the input content. The wavelet texture loss constrains the transfer band, such as high-frequency details are transferred from the reference to output. The degradation loss ensures the downscaled version of the output would still be faithful to the input, such as preserving the color tone and spatial structure.

The feature extraction pipeline of the ANN 400 may include two primary branches: large-scale upscaling (i.e., the upper branch in FIG. 4) and texture transfer (i.e., the lower branch in FIG. 4). Features derived from these branches may then be concatenated and used to reconstruct an image based on a large upscaling factor.

Upscaling

Upscaling component 405 extracts an upscaled feature map from an input image. For example, the upscaling component 405 may use successive steps of upscaling (i.e., increasing the resolution of the image or features by an intermediate upscaling factor) and feature extraction. Thus, in some examples, the upscaling component 405 includes multiple feature extraction layers and a set of upscaling layers. For example, upscaling component 405 may extract a first feature map from the input image and may upscale the first feature map to produce a first upscaled feature map. Upscaling component 405 may then extract a second feature map from the first upscaled feature map, and may upscale the second feature map to produce a second upscaled feature map.

The large-scale upscaling branch extracts features from a low resolution input image, $I_L$, and progressively upscales the feature maps by an intermediate scaling factor, such as 2×, for each of the upscaling layers. At the finest (i.e., highest resolution) scale, such as an 8× scale occurring after the third upscaling layer, the feature maps extracted from the $I_L$ input may be channel-wise concatenated with the transferred feature maps from the texture transfer branch. Therefore, features with high-frequency information transferred from the reference may be combined with the original features from the $I_L$ input. After another feature extraction block and the reconstruction layer, the final super-resolved image may include large scale features from the input image $I_L$ and finer textures from the reference image $I_{Ref}$.

Texture Transfer

The texture transfer branch 410 may extract both feature maps using the pre-trained model. Patch matching may be conducted to search for similar patches between the input and the reference feature maps. Finally, the correspondingly matched feature patches from the reference may be transferred to the input feature maps. The transfer may be performed by patch-wise overwrite.

For example, the texture transfer branch may extract features from the input image, $I_L$, and from the reference image, $I_{Ref}$. Then, matching component 410 matches the input image to a portion of a reference image. The resolution of the reference image may be higher than the resolution of the input image. Matching component 410 may generate a first feature map from the input image using a pre-trained neural network. Matching component 410 may also generate a second feature map from the reference image using the pre-trained neural network. In some examples, the pre-trained neural network includes a deep CNN. For example, a pretrained deep CCN may be used to extract features from the reference image and the input image. In the example shown, a VGG-19 network is used as the pre-trained network, although any suitable feature extraction network may be used.

Matching component 410 may then compare the first feature map to multiple portions of the second feature map to identify an appropriate portion for feature transfer, and the input image may be matched to the portion of the reference image based on the comparison. In some cases, matching component 410 may determine that the reference image includes a texture suitable for the reconstructed image, and may also select the reference image for generating the reconstructed image based on the determination.

Reconstruction

Once the original image is upscaled, and features are extracted from the original image and the reference image, the features from both branches may be combined and an upscaled image may be reconstructed.

Concatenation component 415 concatenates the upscaled feature map with a reference feature map corresponding to the selected portion of the reference image to produce a concatenated feature map. In some examples, the concatenation can be performed by combining the upscaled feature map and the reference feature map without modifying either. Rather, the features may just be combined in a concatenated feature map whose dimensions are equal to the sum of the dimensions of the upscaled feature map and the reference feature map (or by layering them together in an additional dimension).

Thus, concatenation component 415 may also extract a combined feature map from the concatenated feature map, where the reconstructed image is generated based on the combined feature map. Reconstruction component 420 generates a reconstructed image, $I_{SR}$, based on the concatenated feature map using a machine learning model.

For training, the reconstructed image, $I_{SR}$, may be compared to a ground truth image, $I_{GT}$ using a loss function, L. In some cases, the low resolution input image $I_L$ and the reference image $I_{Ref}$ may both be generated based on the ground truth image, $I_{GT}$. In some cases, the machine learning model may be trained with a texture loss, $L_{tex}$, and a degradation loss, $L_{deg}$. The texture loss may be based on a wavelet transform and high frequency band filter. The degradation loss is based on a downscaled version of the reconstructed image, $I_D$.

Thus, the reconstructed image may include texture information from the reference image. In some examples, the texture loss is based on a comparison of a filtered wavelet transform of a feature map of the reconstructed image and a filtered wavelet transform of a feature map of the reference image. In some examples, the degradation loss is based on a comparison of the downscaled version of the reconstructed image and the input image. In some examples, a resolution of the reconstructed image is more than four times higher than the resolution of the input image.

System Operation

Figure 5:
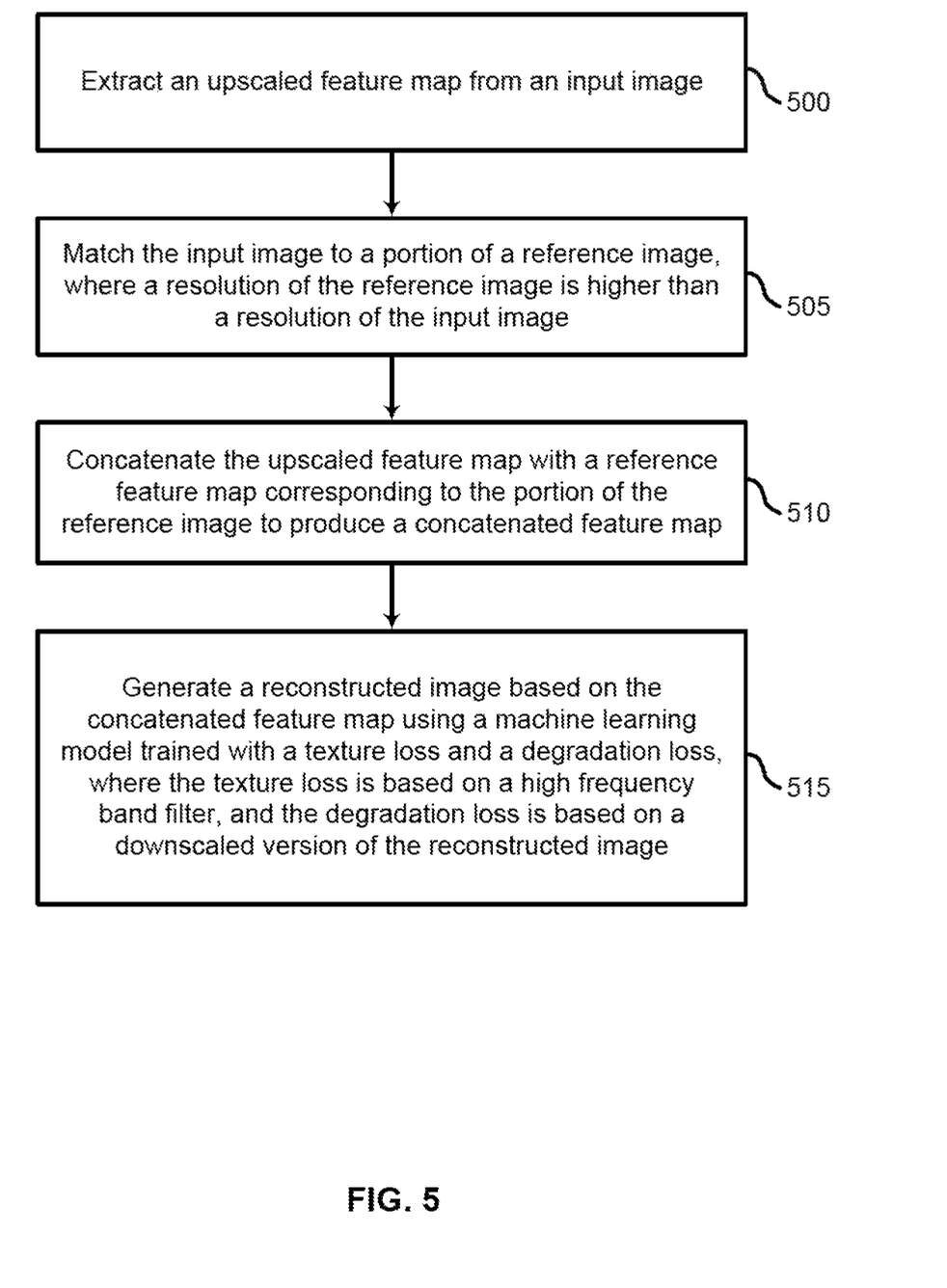
FIG. 5 shows an example of a process for texture hallucination with a large upscaling factor according to aspects of the present disclosure.

FIG. 5 shows an example of a process for texture hallucination with a large upscaling factor according to aspects of the present disclosure. In some examples, these operations may be performed by a system, such as a user terminal or a server, including a processor executing a set of codes. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 500, the system extracts an upscaled feature map from an input image. In some cases, the operations of this step may refer to, or be performed by, an upscaling component as described with reference to FIG. 4. Further detail regarding an example of an upscaling process is described with reference to FIG. 6.

For example, a large-scale upscaling branch may extract features from a low resolution input image and progressively upscales the feature maps by an intermediate scaling factor for each of multiple upscaling layers. At the finest scale, the feature maps extracted from the input may be channel-wise concatenated with the transferred feature maps from the texture transfer branch.

At operation 505, the system matches the input image to a portion of a reference image, where a resolution of the reference image is higher than a resolution of the input image. In some cases, the operations of this step may refer to, or be performed by, a matching component as described with reference to FIG. 4. Further detail regarding an example of a texture transfer process is described with reference to FIG. 7.

In some examples, a texture transfer branch may extract feature maps from a low resolution image and a reference image using a pre-trained model. Patch matching may be conducted to search for similar patches between the input and the reference feature maps. Finally, the correspondingly matched feature patches from the reference may be transferred to the input feature maps. The transfer may be performed by patch-wise overwrite.

At operation 510, the system concatenates the upscaled feature map with a reference feature map corresponding to the portion of the reference image to produce a concatenated feature map. In some cases, the operations of this step may refer to, or be performed by, a concatenation component as described with reference to FIG. 4.

At operation 515, the system generates a reconstructed image based on the concatenated feature map using a machine learning model trained with a texture loss and a degradation loss, where the texture loss is based on a high frequency band filter, and the degradation loss is based on a downscaled version of the reconstructed image. In some cases, the operations of this step may refer to, or be performed by, a reconstruction component as described with reference to FIG. 4.

Figure 6:
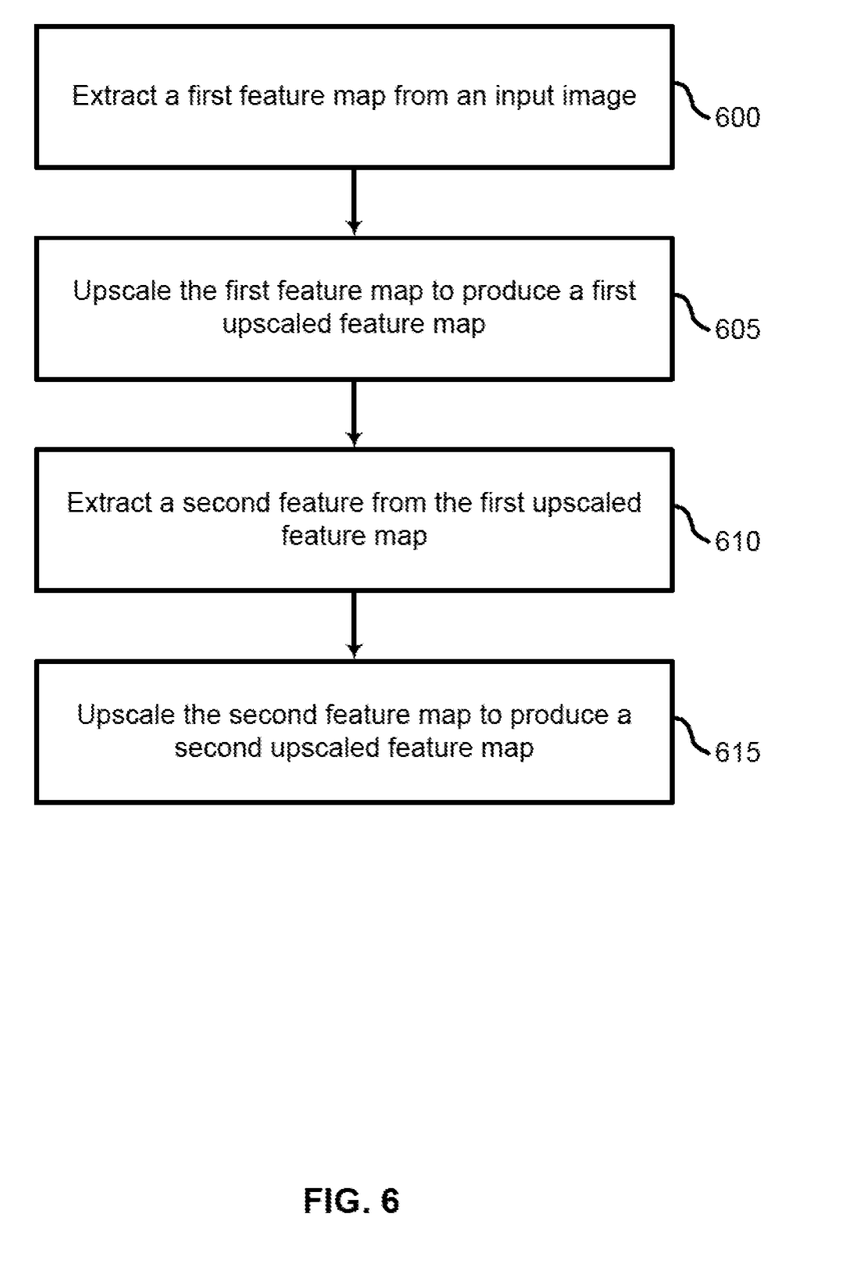
FIG. 6 shows an example of a process for image upscaling according to aspects of the present disclosure.

FIG. 6 shows an example of a process for image upscaling according to aspects of the present disclosure. In some examples, these operations may be performed by a system including an upscaling component as described with reference to FIG. 4. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

In some cases, a large-scale upscaling branch may extract features from a low resolution input image and progressively upscales the feature maps by an intermediate scaling factor for each of multiple upscaling layers. At the finest scale the feature maps extracted from the input may be channel-wise concatenated with the transferred feature maps from the texture transfer branch. Each of the feature extraction layers may be trained during the training process.

At operation 600, the system extracts a first feature map from the input image. At operation 605, the system upscales the first feature map to produce a first upscaled feature map.

At operation 610, the system extracts a second feature map from the first upscaled feature map. At operation 615, the system upscales the second feature map to produce a second upscaled feature map.

Figure 7:
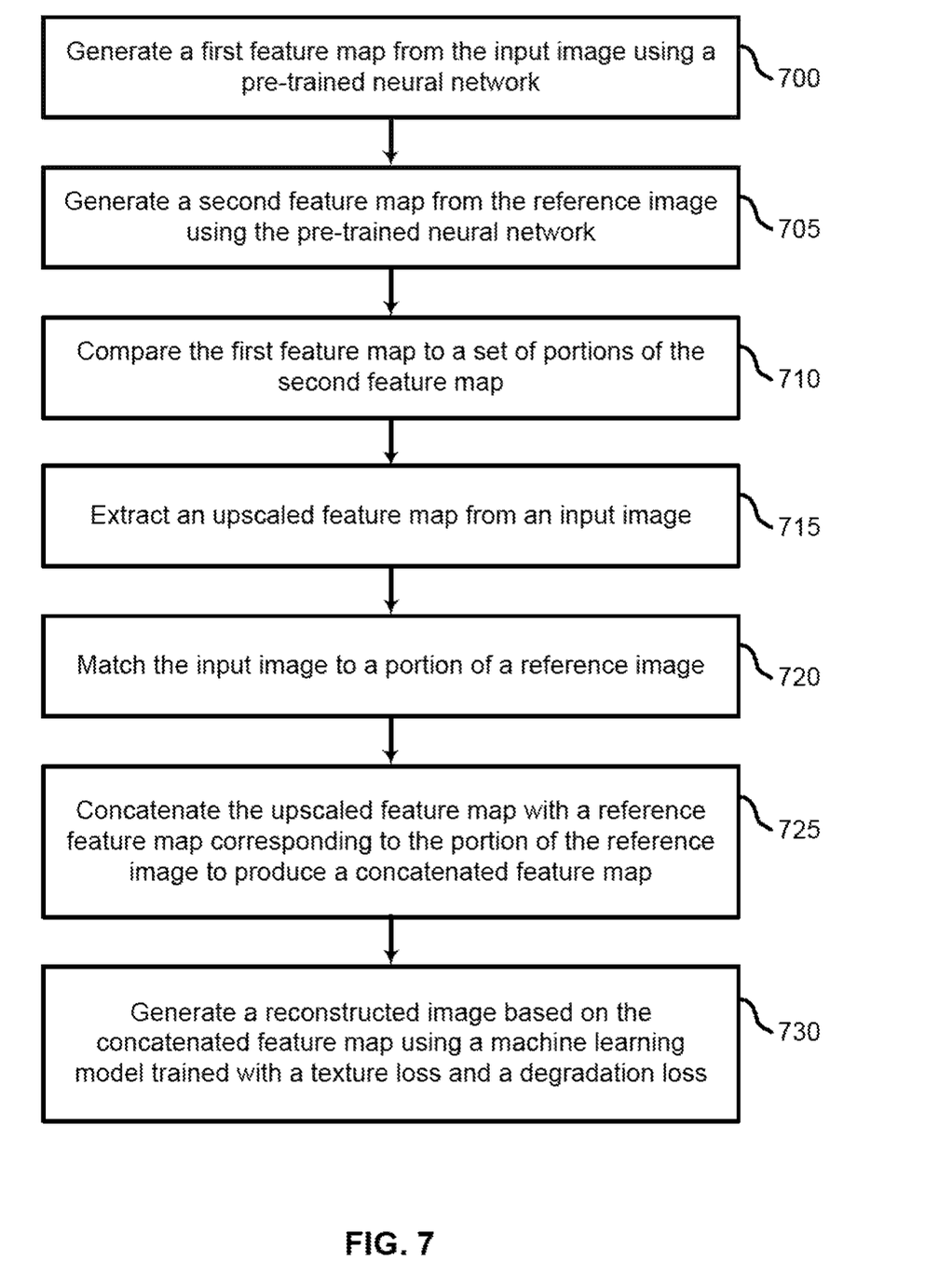
FIG. 7 shows an example of a process for feature extraction according to aspects of the present disclosure.

FIG. 7 shows an example of a process for feature extraction according to aspects of the present disclosure. In some examples, these operations may be performed by a system, such as a user terminal or a server, including a processor executing a set of codes. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

In some examples, a texture transfer branch may extract feature maps from a low resolution image and a reference image using a pre-trained machine learning model. Patch matching may be conducted to search for similar patches between the input the reference feature maps. Finally, the correspondingly matched feature patches from the reference may be transferred to the input feature maps. The transfer may be performed by patch-wise overwrite.

At operation 700, the system generates a first feature map from the input image using a pre-trained neural network. At operation 705, the system generates a second feature map from the reference image using the pre-trained neural network.

At operation 710, the system compares the first feature map to a set of portions of the second feature map. At operation 715, the system extracts an upscaled feature map from an input image.

At operation 720, the system matches the input image to a portion of the reference image based on the comparison. In some cases, the operations of steps 700 through 720 may refer to, or be performed by, a matching component as described with reference to FIG. 4.

At operation 725, the system concatenates the upscaled feature map with a reference feature map corresponding to the portion of the reference image to produce a concatenated feature map. In some cases, the operations of this step may refer to, or be performed by, a concatenation component as described with reference to FIG. 4.

At operation 730, the system generates a reconstructed image based on the concatenated feature map using a machine learning model trained with a texture loss and a degradation loss, where the texture loss is based on a high frequency band filter, and the degradation loss is based on a downscaled version of the reconstructed image. In some cases, the operations of this step may refer to, or be performed by, a reconstruction component as described with reference to FIG. 4.

Training

Figure 8:
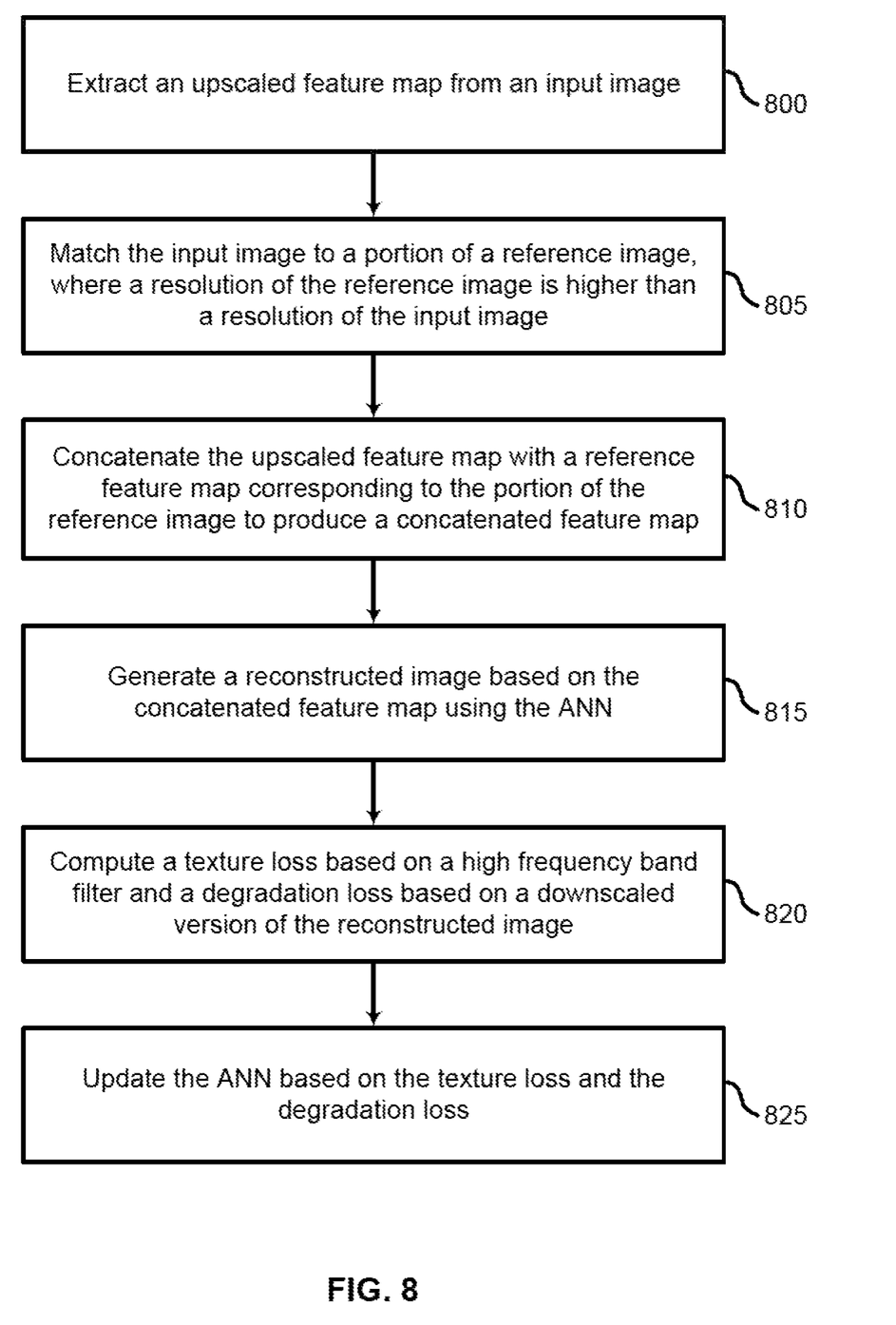
FIG. 8 shows an example of a process for training an ANN for texture hallucination with a large upscaling factor according to aspects of the present disclosure.

FIG. 8 shows an example of a process for training an ANN for texture hallucination with a large upscaling factor according to aspects of the present disclosure. In some examples, these operations may be performed by a system, such as a user terminal or a server, including a processor executing a set of codes. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

In various embodiments, an ANN may be trained using a loss function including a combination of a reconstruction loss, a perception loss, an adversarial loss, a texture loss, and a degradation loss. In some examples, the training process may be divided into initial training and full training stages.

During the initial training stage, two or more losses may be used. The losses may include a reconstruction loss $L_{rec}$ between the output $I_{SR}$ and the ground truth $I_{GT}$, and wavelet texture loss $L_{tex}$ between the output $I_{SR}$ and the reference $I_{Ref}$. The wavelet texture loss can be expressed according to Equation 1:

$$L_{tex} = \sum_l \lambda_l \left\| Gr(\phi^l(H_W^{HH}(I_{SR}))) - Gr(F_T^l) \right\|_F \quad (1)$$

where $H_W^{HH}(\cdot)$ extracts high-frequency components from the upscaled output $I_{SR}$ with Haar wavelet transformation kernel $$HH^T = \begin{bmatrix} 0.5 & -0.5 \\ -0.5 & 0.5 \end{bmatrix}. \; F_T^l$$

is the transferred feature in feature map space of $\phi^l$. $Gr(\cdot)$ calculates the Gram matrix for each level l, where $\lambda_l$ is the corresponding normalization weight. $\|\cdot\|_F$ denotes Frobenius norm.

In the full training stage, additional losses other than $L_{rec}$ and $L_{tex}$, are conducted between the output $I_{SR}$ and ground truth $I_{GT}$. One loss may be a perceptual loss $L_{per}$. Another loss may be an adversarial loss $L_{adv}$. Another loss may be a degradation loss $L_{deg}$, which forces the output to be identical to the input at the LR scale. The degradation loss $L_{deg}$ allows the output to have more details from a reference while maintaining a low-resolution structure. Degradation loss $L_{deg}$ is expressed according to equation 2:

$$L_{deg} = \|H_D(I_{SR}) - I_{LR}\|_1 \quad (2)$$

where $H_D(\cdot)$ denotes a degradation network that simulates the downscaling process of obtaining the LR inputs. $\|\cdot\|_1$ denotes $l_1$-norm.

Thus, at operation 800, the system extracts an upscaled feature map from an input image. In some cases, the operations of this step may refer to, or be performed by, an upscaling component as described with reference to FIG. 4.

At operation 805, the system matches the input image to a portion of a reference image, where a resolution of the reference image is higher than a resolution of the input image. In some cases, the operations of this step may refer to, or be performed by, a matching component as described with reference to FIG. 4.

At operation 810, the system concatenates the upscaled feature map with a reference feature map corresponding to the portion of the reference image to produce a concatenated feature map. In some cases, the operations of this step may refer to, or be performed by, a concatenation component as described with reference to FIG. 4.

At operation 815, the system generates a reconstructed image based on the concatenated feature map using the ANN. In some cases, the operations of this step may refer to, or be performed by, a reconstruction component as described with reference to FIG. 4.

At operation 820, the system computes a texture loss based on a high frequency band filter and a degradation loss based on a downscaled version of the reconstructed image. In some cases, the operations of this step may refer to, or be performed by, a training component as described with reference to FIG. 2.

At operation 825, the system updates the ANN based on the loss functions (i.e., based on the degradation loss and the texture loss, and one or more other loss functions). In some cases, the operations of this step may refer to, or be performed by, a training component as described with reference to FIG. 2.

Accordingly, the present disclosure includes the following embodiments.

A method for texture hallucination with a large upscaling factor is described. Embodiments of the method may include extracting an upscaled feature map from an input image, matching the input image to a portion of a reference image, wherein a resolution of the reference image is higher than a resolution of the input image, concatenating the upscaled feature map with a reference feature map corresponding to the portion of the reference image to produce a concatenated feature map, and generating a reconstructed image based on the concatenated feature map using a machine learning model trained with a texture loss and a degradation loss, wherein the texture loss is based on a high frequency band filter, and the degradation loss is based on a downscaled version of the reconstructed image.

An apparatus for texture hallucination with a large upscaling factor is described. The apparatus may include a processor, memory in electronic communication with the processor, and instructions stored in the memory. The instructions may be operable to cause the processor to extract an upscaled feature map from an input image, match the input image to a portion of a reference image, wherein a resolution of the reference image is higher than a resolution of the input image, concatenate the upscaled feature map with a reference feature map corresponding to the portion of the reference image to produce a concatenated feature map, and generate a reconstructed image based on the concatenated feature map using a machine learning model trained with a texture loss and a degradation loss, wherein the texture loss is based on a high frequency band filter, and the degradation loss is based on a downscaled version of the reconstructed image.

A non-transitory computer readable medium storing code for texture hallucination with a large upscaling factor is described. In some examples, the code comprises instructions executable by a processor to: extract an upscaled feature map from an input image, match the input image to a portion of a reference image, wherein a resolution of the reference image is higher than a resolution of the input image, concatenate the upscaled feature map with a reference feature map corresponding to the portion of the reference image to produce a concatenated feature map, and generate a reconstructed image based on the concatenated feature map using a machine learning model trained with a texture loss and a degradation loss, wherein the texture loss is based on a high frequency band filter, and the degradation loss is based on a downscaled version of the reconstructed image.

In some examples, the reconstructed image comprises texture information from the reference image. Some examples of the method, apparatus, and non-transitory computer readable medium described above may further include extracting a first feature map from the input image. Some examples may further include upscaling the first feature map to produce a first upscaled feature map. Some examples may further include extracting a second feature map from the first upscaled feature map. Some examples may further include upscaling the second feature map to produce a second upscaled feature map, wherein the upscaled feature map is based on the second upscaled feature map.

Some examples of the method, apparatus, and non-transitory computer readable medium described above may further include generating a first feature map from the input image using a pre-trained neural network. Some examples may further include generating a second feature map from the reference image using the pre-trained neural network. Some examples may further include comparing the first feature map to a plurality of portions of the second feature map, wherein the input image is matched to the portion of the reference image based on the comparison. In some examples, the pre-trained neural network comprises a deep convolutional neural network (CNN).

Some examples of the method, apparatus, and non-transitory computer readable medium described above may further include extracting a combined feature map from the concatenated feature map, wherein the reconstructed image is generated based on the combined feature map. Some examples of the method, apparatus, and non-transitory computer readable medium described above may further include determining that the reference image comprises a texture suitable for the reconstructed image. Some examples may further include selecting the reference image for generating the reconstructed image based on the determination.

In some examples, the texture loss is based on a comparison of a filtered wavelet transform of a feature map of the reconstructed image and a filtered wavelet transform of a feature map of the reference image. In some examples, the degradation loss is based on a comparison of the downscaled version of the reconstructed image and the input image. In some examples, a resolution of the reconstructed image is more than four times higher than the resolution of the input image. In some examples, the texture loss is computed during a first training stage and the degradation loss is computed during a second training stage.

In some examples, the first training stage is further based on a reconstruction loss comparing the reconstructed image and a ground truth image. In some examples, the second training stage is further based on a perceptual loss comparing the reconstructed image and a ground truth image and an adversarial loss based on the reconstructed image.

Some examples of the method, apparatus, and non-transitory computer readable medium described above may further include performing a wavelet transform on the reference feature map and on a feature map of the reconstructed image. Some examples may further include comparing a high-frequency portion of the wavelet transform of the reference feature map with a high frequency portion of the wavelet transform of the feature map of the reconstructed image, wherein the texture loss is based on the comparison.

Some examples of the method, apparatus, and non-transitory computer readable medium described above may further include downscaling the reconstructed image to produce the downscaled version of the reconstructed image.

An apparatus for texture hallucination with a large upscaling factor is described. Embodiments of the apparatus may include an upscaling component configured to extract an upscaled feature map from an input image, a matching component configured to match the input image to a portion of a reference image, wherein a resolution of the reference image is higher than a resolution of the input image, a concatenation component configured to concatenate the upscaled feature map with a reference feature map corresponding to the portion of the reference image to produce a concatenated feature map, and a reconstruction component configured to generate a reconstructed image based on the concatenated feature map, wherein the reconstruction component is trained with a texture loss and a degradation loss, wherein the texture loss is based on a high frequency band filter, and the degradation loss is based on a downscaled version of the reconstructed image.

A method of manufacturing an apparatus for texture hallucination with a large upscaling factor is described. The method may include providing an upscaling component configured to extract an upscaled feature map from an input image, providing a matching component configured to match the input image to a portion of a reference image, wherein a resolution of the reference image is higher than a resolution of the input image, providing a concatenation component configured to concatenate the upscaled feature map with a reference feature map corresponding to the portion of the reference image to produce a concatenated feature map, and providing a reconstruction component configured to generate a reconstructed image based on the concatenated feature map, wherein the reconstruction component is trained with a texture loss and a degradation loss, wherein the texture loss is based on a high frequency band filter, and the degradation loss is based on a downscaled version of the reconstructed image.

In some examples, the upscaling component comprises a plurality of feature extraction layers and a plurality of upscaling layers. In some examples, the matching component comprises a pre-trained CNN. Some examples of the apparatus and method described above may further include a training component configured to compute the texture loss and the degradation loss and to train the reconstruction component.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image upscaling, comprising:
   receiving an input image and a reference image;
   generating a combined feature map using a machine learning model that constrains a transfer of features to high frequency features from the reference image, the combined feature map including large scale features from the input image and the high frequency features from the reference image; and
   generating a reconstructed image based on the combined feature map, wherein the reconstructed image comprises an upscaled version of the input image with texture detail derived from the high frequency features from the reference image,
   wherein the machine learning model is trained using a texture loss based on a high frequency band filter that encourages transfer of the texture detail.

2. The method of claim 1, further comprising:
   extracting an upscaled feature map from the input image;
   matching the input image to a portion of the reference image, wherein a resolution of the reference image is higher than a resolution of the input image;
   concatenating the upscaled feature map with a reference feature map corresponding to the portion of the reference image to produce a concatenated feature map, wherein the combined feature map is generated based on the concatenated feature map.

3. The method of claim 2, wherein extracting the upscaled feature map comprises:
extracting a first feature map from the input image;
upscaling the first feature map to produce a first upscaled feature map;
extracting a second feature map from the first upscaled feature map; and
upscaling the second feature map to produce a second upscaled feature map, wherein the upscaled feature map is based on the second upscaled feature map.

4. The method of claim 1, further comprising:
generating a first feature map from the input image using a pre-trained neural network;
generating a second feature map from the reference image using the pre-trained neural network; and
comparing the first feature map to a plurality of portions of the second feature map, wherein the input image is matched to the portion of the reference image based on the comparison.

5. The method of claim 4, wherein:
the pre-trained neural network comprises a deep convolutional neural network (CNN).

6. The method of claim 1, further comprising:
extracting the combined feature map from a concatenated feature map.

7. The method of claim 1, further comprising:
determining that the reference image comprises a texture suitable for the reconstructed image; and
selecting the reference image for generating the reconstructed image based on the determination.

8. The method of claim 1, further comprising:
applying the high frequency band filter to produce a first filtered wavelet transform of a feature map of the reconstructed image and a second filtered wavelet transform of a feature map of the reference image;
comparing the first filtered wavelet transform and the second filtered wavelet transform, wherein the texture loss is based on the comparison.

9. The method of claim 1, wherein:
the machine learning model is further trained using a degradation loss based on a comparison of a downscaled version of the reconstructed image to the input image.

10. The method of claim 1, wherein:
a resolution of the reconstructed image is more than four times higher than the resolution of the input image.

11. A method of training an artificial neural network (ANN) for image upscaling, the method comprising:
extract an upscaled feature map from an input image;
match the input image to a portion of a reference image, wherein a resolution of the reference image is higher than a resolution of the input image;
concatenate the upscaled feature map with a reference feature map corresponding to the portion of the reference image to produce a concatenated feature map;
generate a reconstructed image based on the concatenated feature map using the $ANN_A$ wherein the reconstructed image comprises an upscaled version of the input image with texture detail derived from high frequency features from the reference image;
compute a texture loss based on a high frequency band filter that encourages transfer of texture detail and a degradation loss based on a downscaled version of the reconstructed image; and
update the ANN based on the texture loss and the degradation loss.

12. The method of claim 11, wherein:
the texture loss is computed during a first training stage and the degradation loss is computed during a second training stage.

13. The method of claim 12, wherein:
the first training stage is further based on a reconstruction loss comparing the reconstructed image and a ground truth image.

14. The method of claim 12, wherein:
the second training stage is further based on a perceptual loss comparing the reconstructed image and a ground truth image and an adversarial loss based on the reconstructed image.

15. The method of claim 11, further comprising:
performing a wavelet transform on the reference feature map and on a feature map of the reconstructed image;
compare a high-frequency portion of the wavelet transform of the reference feature map with a high frequency portion of the wavelet transform of the feature map of the reconstructed image, wherein the texture loss is based on the comparison.

16. The method of claim 11, further comprising:
downscaling the reconstructed image to produce the downscaled version of the reconstructed image; and
comparing the downscaled version of the reconstructed image to the input image.

17. An apparatus for image upscaling, comprising:
an upscaling component configured to extract an upscaled feature map from an input image;
a matching component configured to match the input image to a portion of a reference image, wherein a resolution of the reference image is higher than a resolution of the input image;
a concatenation component configured to concatenate the upscaled feature map with a reference feature map corresponding to the portion of the reference image to produce a concatenated feature map, wherein the reference feature map constrains a transfer of high frequency features from the reference image to high frequency features; and
a reconstruction component configured to generate a reconstructed image based on the concatenated feature map, wherein the reconstruction component is trained with a texture loss and a degradation loss, wherein the texture loss is based on a high frequency band filter that encourages transfer of texture detail, and the degradation loss is based on a downscaled version of the reconstructed image.

18. The apparatus of claim 17, wherein:
the upscaling component comprises a plurality of feature extraction layers and a plurality of upscaling layers.

19. The apparatus of claim 17, wherein:
the matching component comprises a pre-trained convolutional neural network (CNN).

20. The apparatus of claim 17, further comprising:
a training component configured to compute the texture loss and the degradation loss and to train the reconstruction component.

* * * * *